F. H. TALBOT.
RUBBER TIRE ARMOR.
APPLICATION FILED AUG. 21, 1914.
1,138,999.
Patented May 11, 1915.
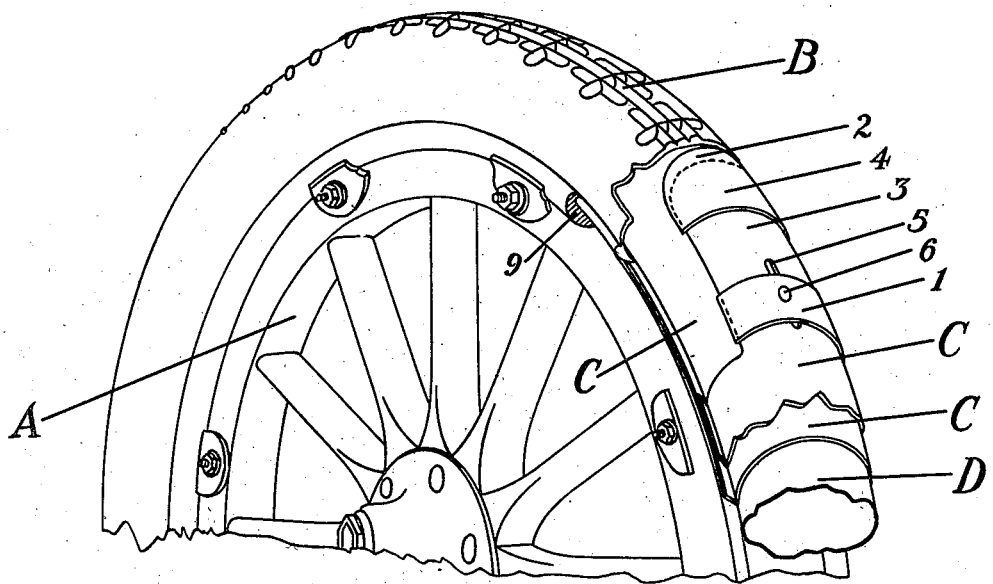
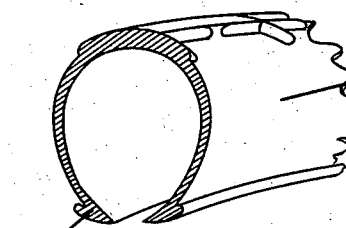
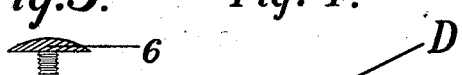
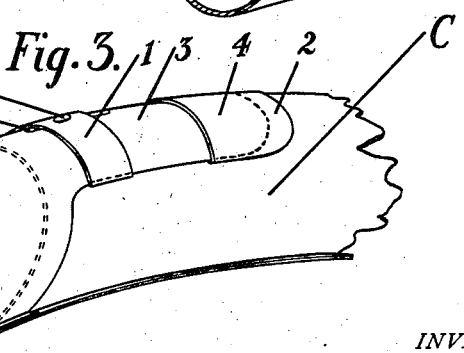
WITNESSES:
C. H. Bicktel
William John Schultz
INVENTOR.
Freak. H. Talbot
BY
T. V. Maxedon
ATTORNEY.

UNITED STATES PATENT OFFICE.

FRANK H. TALBOT, OF CINCINNATI, OHIO.

RUBBER-TIRE ARMOR.

1,138,999. Specification of Letters Patent. Patented May 11, 1915.

Application filed August 21, 1914. Serial No. 857,856.

*To all whom it may concern:*

Be it known that I, FRANK H. TALBOT, a citizen of the United States, residing at Cincinnati, in the county of Hamilton and State of Ohio, have invented new and useful Improvements in Rubber-Tire Armor, of which the following is a specification.

My invention relates to vehicle rubber tires and more particularly to that class of rubber tires known as pneumatic automobile tires.

The objects of my invention are: First. To afford an armor or protector for the pneumatic tube of said tires against any possible puncture of said tube in the actual use thereof. Second. To overcome the possibility of blow-outs occasioned by a rupture of the outside tire, which occurs most usually in the side of the tire. Third. To strengthen the outside tire and keep it constantly expanded.

I accomplish the aforesaid objects by means of the mechanism hereinafter described and also illustrated, in which illustrations like reference characters represent like parts in all figures.

Figure 1 is a perspective view of a portion of an automobile wheel, with certain parts of the tire broken away in order to expose to view certain other parts thereof. Fig. 2 is a perspective view of a detached portion of an outside tire showing in section the peculiar shape of the longitudinal edges thereof. Fig. 3 is a perspective view of a detached portion of my invention which consists of a steel armor or casing adapted to neatly cover the pneumatic tube of said tire, said view showing the manner in which the free ends thereof slidably engage each other. Fig. 4 is a perspective view of a detached portion of the pneumatic tube of said tire. Fig. 5 is an elevation of a screw adapted to give direction to the overlapping ends of my invention in their movement one upon the other by fixedly engaging a perforation in the one and slidingly engaging an alining slot in the other.

A is a portion of an automobile wheel. B is the outside tire thereof. C is my aforesaid invention. D is the pneumatic tube of the tire of said wheel. 1 is a loop in the under-lapping end of the armor, said loop being effected by slitting the armor transversely in two parallel lines and then by pressing said loop outwardly, said loop also being adapted to permit the finger 3 to pass slidingly underneath it. 2 is a pocket-shaped loop in the under-lapping end of said armor, said loop being effected by the use of a single transverse slit in said armor and then by pressing said loop outwardly, said loop being adapted to permit the end 4 of said finger to slidingly pass underneath it. 5 is a slot cut longitudinally through said finger, said slot being adapted to receive the end of the screw 6. 7 is one of the horizontal abutting edges, spear-shaped in section, of said outside tire. 8 is one of the horizontal abutting out-turned edges of said armor. 9 is one of the in-turned edges of the metal rim of said wheel. Said spear-shaped edge 7 is adapted to engage said inturned edge 9, and said out-turned edge 8 is adapted to engage said spear-shaped edge 7. Said pneumatic tube D when inflated is adapted to expand said outside tire B and impart resilience thereto, and said armor C is adapted to augment the resilience of said tube, to protect it from punctures, to assist in expanding said outside tire and to prevent blow-outs. Said finger 3 taken in connection with said loops 1 and 2 is adapted to slidingly interlock the ends of said armor. Said screw 6 taken in connection with said slot 5 is adapted to prevent the ends of said armor from pulling apart.

Having thus described my invention in detail and by illustrations, I will now describe it as a working mechanism. At every revolution of said wheel, every portion of said armor is brought into action. When the interlocked ends of said armor are forced either toward or away from each other, the finger and loop mechanism described above yieldably accommodates itself to the strain. If a puncturing obstacle is encountered, the cutting point or edge thereof can penetrate only to said armor and is there arrested altogether or else turned aside. If a rupture occurs in the side of the outside tire, said armor, intervening between said rupture and said pneumatic tube, prevents a blow-out. In addition to all this, said tube being protected at every vulnerable point, there is at all times, regardless of punctures and ruptures of the outside tire, a combined resilience of said tube and said armor that keeps said outside tire constantly expanded and in working condition.

Having thus described my invention in detail, by illustrations and as a working mechanism, what I claim is:—

In a rubber vehicle tire, an armor, consisting of any suitable metal formed and fashioned into a circular tube, having its inner side slitted longitudinally, the longitudinal edges of said slit being out-turned, one end of said tube having on its upper side a loop and a loop-shaped pocket, the other end of said tube having a longitudinally-slotted finger-shaped extension therefrom, in combination with a screw, said loop and said loop-shaped pocket being adapted to receive said finger-shaped extension slidingly, said screw being adapted to fixedly engage a perforation through said loop and slidingly engage the slot through said finger-shaped extension, said outturned edges being adapted to engage the longitudinal edges of the outside portion of said tire.

In testimony whereof I have hereunto set my hand in presence of two subscribing witnesses.

FRANK H. TALBOT.

Witnesses:
C. M. BECHTEL,
WILLIAM JOHN SCHULTZ.